Oct. 2, 1945.  H. L. NEWELL  2,386,056
ELECTRICAL CONNECTION MEANS
Filed April 16, 1943  2 Sheets-Sheet 1
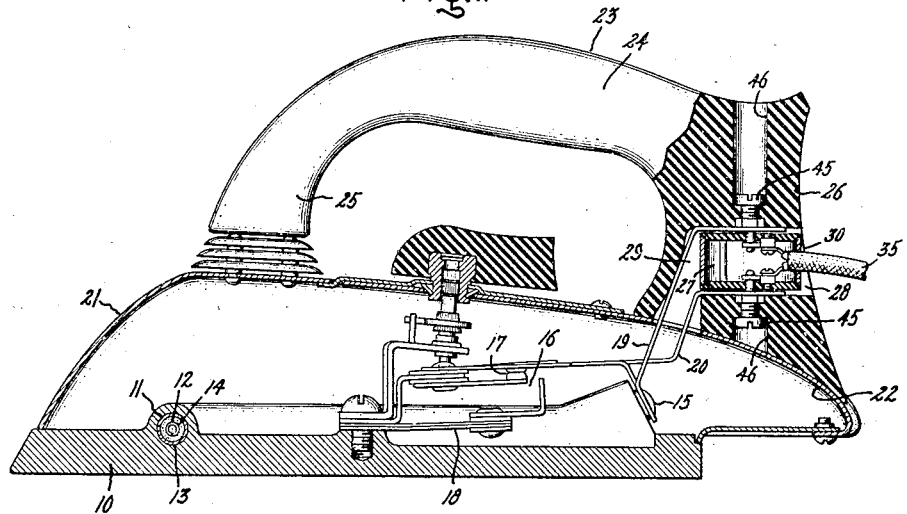
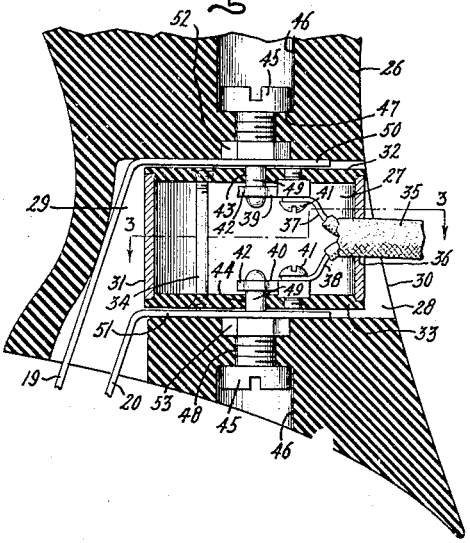
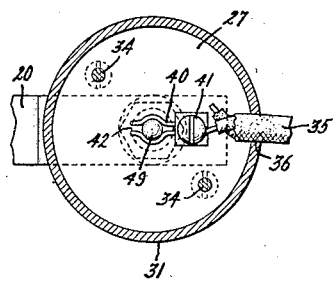
Inventor:
Heber L. Newell,
by Harry E. Dunham
His Attorney.

Oct. 2, 1945.    H. L. NEWELL    2,386,056
ELECTRICAL CONNECTION MEANS
Filed April 16, 1943    2 Sheets-Sheet 2
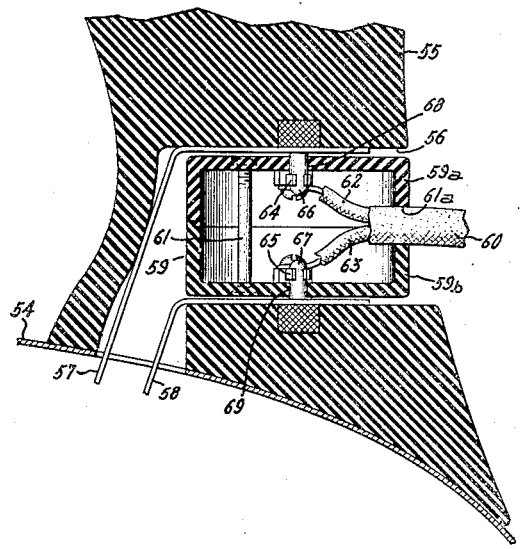
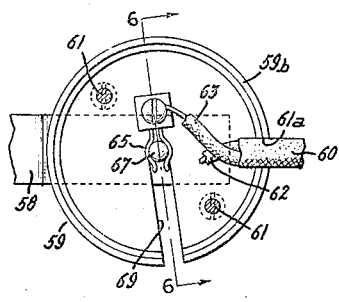
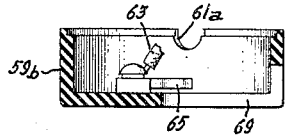
Inventor:
Heber L. Newell,
by Harry E. Dunham
His Attorney.

Patented Oct. 2, 1945

2,386,056

UNITED STATES PATENT OFFICE 2,386,056

ELECTRICAL CONNECTION MEANS

Heber L. Newell, Bridgeport, Conn., assignor to General Electric Company, a corporation of New York Application April 16, 1943, Serial No. 483,270

7 Claims. (Cl. 173—324)

This invention relates to an electrical connection device for connecting an electrical translating device to a power source, more particularly for connecting a portable electrical appliance such as a flatiron to its power source through a flexible supply cord, and it has for its object the provision of an improved device of this character.

This invention is especially applicable to a swivel connector for an appliance, and it contemplates a device which has a simple and inexpensive construction, which is removable from the appliance, and which is electrically safe and mechanically strong.

In accordance with this invention in one form thereof, the appliance is provided with a pair of suitable supply leads. A casing is provided for receiving the supply conductors of the supply cord, and within the casing are fixed connector members which are electrically insulated from the casing and which are electrically connected to the supply cord conductors. Electrically connected to the leads are fixed aligned electrical conducting pins which are projected through openings provided for them in the walls of the casing whereby the casing is rotatably mounted with reference to the appliance. These pins are in electrical engagement with the fixed contacts mounted within the casing. The arrangement is such that the casing can swivel with reference to the iron so as to greatly facilitate the manipulation of the iron in the ironing operations.

In one form of this invention, the pins, which function both as pivotal supports for the casing and which electrically connect the conductors of the supply cord to the appliance leads are removable so that the casing with the cord attached may be removed as a unit. Inasmuch as the fixed connectors are housed within the casing and electrically insulated from the outside thereof, the device is electrically safe even though the cord be plugged into the supply source when the casing is removed.

In another form of this invention, the pins are fixed and the casing is constructed so that in one angular position thereof it can be removed from the pins.

For a more complete understanding of this invention, reference should be had to the accompanying drawings in which Fig. 1 is an elevation, mainly in section, of an electrically heated flatiron provided with connector means arranged in accordance with this invention; Fig. 2 is an enlarged fragmentary sectional view taken through a portion of the flatiron structure shown in Fig. 1; Fig. 3 is a sectional view taken through the line 3—3 of Fig. 2 and looking in the direction of the arrows; Fig. 4 is a fragmentary view illustrating a flatiron provided with connector means of modified form arranged in accordance with this invention; Fig. 5 is a top plan view of the casing used in the construction shown in Fig. 4; and Fig. 6 is a sectional view taken through the line 6—6 of Fig. 5 and looking in the direction of the arrows.

Referring more particularly to Figs. 1 to 3, this invention has been shown in one form as applied to an electrically heated flatiron comprising a sole plate 10 which is electrically heated by a heating element 11. The heating element 11 preferably will be of the sheathed type having a helical resistance conductor 12 mounted within an outer metallic casing 13, and supported in spaced relation with reference to the casing and electrically insulated from it by a compacted mass 14 formed of any suitable electrically insulating and heat conducting material, such as granular magnesium oxide. Preferably and as shown, the heating element 10 will be cast within the sole plate 10, and preferably it will have roughly a U-shape with its terminals 15 located at the rear of the sole plate.

Also, preferably the iron will be of the automatic type in the sense that the energization of the heating unit 11 is controlled in order to hold an even temperature in the sole plate. As shown, the heating means is controlled by a temperature responsive operating element 18 that is connected in thermal relation with the sole plate 10. This switch is described and claimed in the United States Patent to James R. Campbell, No. 2,158,850, and dated May 16, 1939.

The iron is provided with a pair of supply leads 19 and 20. It will be understood that leads 19 and 20 are so arranged that when they are connected to the opposite sides of a supply source the heating element 11 will be energized with the switch 16 connected in series with it.

The sole plate is enclosed by means of a suitable shell 21 which at its rear terminates in a heel rest section 22.

Attached to the shell is a handle structure 23 provided with a hand-grasping portion 24, a front supporting post 25 and a rear supporting post 26. Preferably and as shown, the hand-grasping portion 24 and the two posts 25 and 26 are integrally united, and preferably they will be molded from a suitable electrically insulating material, such as an insulating phenol condensation product. It will be understood that the lower ends of the two posts 25 and 26 will be secured to the top wall of the shell 21 in any suitable way.

The connector means arranged in accordance with this invention comprises a suitable cylindrical casing or housing 27 which is inserted in a transverse recess 28 provided for it in the rear post 26, as clearly shown. The recess 28 is provided with an inner opening 29, and an outer opening 30 which opens through the rear wall of the post 26, as shown; it is through this rear opening 30 that the cylindrical casing 27 is inserted into the recess.

The casing 27 is provided with a cylindrical rigid side wall 31 which may be formed of any suitable material, such as a metal, and which is closed at the top and bottom by means of top and bottom walls 32 and 33; these latter walls are formed from a suitable electrically insulating material, such as an insulating phenol condensation product. The top and bottom walls may be secured to the side wall 31 in any suitable way as by screw-fastening means 34, countersunk into them, as shown.

Also, entering the outer opening 30 of the recess 28 is an electrical supply cord 35 of the twin conductor type. The cord, as shown, is inserted into the casing 27 through an opening 36 provided for it in the side wall 31 of the casing. The two conductors 37 and 38 of the cord are electrically and mechanically connected to connector members 39 and 40, respectively, which are secured to the top and bottom walls 32 and 33, respectively, by means of screws 41. The connector members 39 and 40 are of the forked construction type, each being provided with a forked section 42, as shown; and the two forked sections are in alignment with each other.

The top and bottom walls 32 and 33 of the casing are provided with openings 43 and 44 which are in alignment with the forked sections 42. These openings are used to pivotally mount the casing within the recess 28. For the purpose of rotatably mounting the casing 27 within its recess, and also for electrically interconnecting the terminal sections 42 with the leads 19 and 20, a pair of screws 45 are mounted in the handle structure. As shown, they are mounted in a pair of vertically positioned aligned bores 46 provided in the post 26 and which open into the recess through its top and bottom walls. The heads of the screws 45 bear against shoulders 47 provided for them in the bores 46, and the shanks of the screws extend through small passageways 48 at the inner ends of the bores. The screws are provided with pin-like extensions 49 which are projected through the aligned openings 43 and 44 in the top and bottom walls of the casing, as clearly shown in Figs. 1 and 2. The pins 49 have such a length that they project sufficiently far into the casing to be received by the two prongs of the forked ends 42 of the connector members.

As pointed out previously, the screws 45 also function to connect the connector members 39 and 40 electrically with the heads 19 and 20. For this purpose, the leads 19 and 20 are provided with sections 50 and 51 respectively which enter the recess 28 through its rear opening 29 and which lie respectively against the upper and lower walls of the recess with the casing 27 received between them, as shown. These sections 50 and 51 are provided with openings which are aligned with the bores 46 and with the openings 43 and 44 in the top and bottom walls of the casing, and the pins 49 are projected through these openings in the leads. Preferably, the openings in the leads will be threaded so as to threadedly receive the screws. In order to provide a more secure and better electrical and mechanical connection between the screws and the lead sections, the lead sections may have attached thereto suitable nuts 52 and 53 respectively which threadedly receive the screws. The nuts may be attached to the lead sections in any suitable way, as by welding.

It will be understood that in assembling the housing 27 with the appliance, the housing will be inserted into the recess 28 in proper relation with the bores 46, and then the screws 45 will be inserted in the bores and threaded into the nuts 52 and 53 so that their pins 49 are received in the apertures in the top and bottom walls of the casing to pivotally mount it. It will be further understood that by this very act, the pins 49 will be received between the two prongs of the forked sections 42 in frictional engagement with them so as to effect a good electrical connection between the supply cord and the leads 19 and 20 of the iron which are connected with the pins.

It will also be understood that the housing 27 and cord 35 may be swiveled on a vertical axis with reference to the appliance so as to facilitate the handling of the iron.

Also it will be understood that the connector structure may be removed merely by withdrawing the screws 45 from their bores 46. It should be noted that when the connector structure is removed it is electrically safe even if the cord 26 be plugged into a supply source socket, because the connectors 40 are housed within the casing and they have no electrical connection through any part of the casing to its exterior.

In Figs. 4 to 6 there is shown a form of this invention in which it is not necessary in order to release the casing to remove the combined holding and connecting pins, as in the first form described.

In the second form illustrated, the iron is provided with a shell 54 and a rear handle standard 55 having a recess 56 therein for receiving the iron leads 57 and 58. Interposed in the recess is an insulating housing 59 through the side wall of which is inserted a supply cord 60. The housing 59, as shown, is formed of twin halves 59a and 59b clamped together by bolts 61. And the edges of the side walls are provided with semicircular complementary recesses 61a which in the assembled structure form a circular opening through which the cord 60 is inserted, as shown in Fig. 4.

The supply cord 60 has its two conductors 62 and 63 connected to the fork-like connection members 64 and 65, respectively, which are secured to the top and bottom walls of the casing 59, as shown.

Pins 66 and 67 rotatably mount the casing 59 and electrically connect the conductors 62 and 63 with the leads 57 and 58. Here, however, the pins are fixed having knurled heads, as shown, secured to the handle. These pins are inserted through radial slots 68 and 69 respectively in the top and bottom walls of the housing 59, aligned with the openings in the connectors 64 and 65, and which are arranged substantially at right angles, or slightly less than a right angle, to the direction of the cord 61. When the housing 59 is inserted into the handle recess 56 in one particular position the slots 68 and 69 receive the pins 66 and 67 and permit the housing to be moved into its proper position where the pins are clamped by the prongs of the forks 64 and 65. It will be observed that since the cord 61 is substantially at a right angle to the slots 68 and 69, pulls on the cord will never tend to remove the housing from the handle.

It will be understood that, as before, the pins 66 and 67 will be inserted through openings provided for them in the leads 57 and 58, and will be electrically connected to them.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A swivel electrical supply connector structure comprising a pair of fixed opposed supply leads, a pair of aligned opposed electrically conducting pins electrically connected to said leads and projecting towards each other from said leads, a casing interposed between said leads and provided with openings receiving said pins so that it is journaled on them for rotation with reference to the said leads positioned on opposite sides thereof, an electrical supply cord having its conductors entering said casing, and means connecting said conductors to said pins respectively, said means permitting the rotation of said casing with reference to said leads.

2. Electrical supply connector means comprising a member provided with a recess having opposed walls, a pair of opposed supply leads entering said recess and lying against said opposed walls respectively, a casing within said recess interposed between said leads, electrically conducting pins in said recess for rotatably supporting said casing, a supply conductor having conducting elements entering said casing, connectors within said casing connected to said conducting elements and yieldingly engaging said pins, and means electrically connecting said pins with said leads.

3. Electrical supply connector means comprising a pair of opposed supply leads, a member provided with a recess for receiving said leads, a casing within said recess between said leads, said leads being provided with aligned openings, electrically conducting pins mounted in said member so as to project through said openings and to be in electrical contact with said leads, a housing within said recess having opposed top and bottom electrically insulating walls, said walls having apertures through which said pins project so that the housing is journaled for rotation on said pins, fork-shaped connectors secured to said insulating walls and having the two prongs thereof engaging opposite sides of said pins, and a supply cord having conductors in said housing secured to said connectors.

4. Electrical connector means comprising a housing provided with opposed electrically insulating walls having aligned openings therein, a member provided with a recess for receiving said housing, supply leads also entering said recess and positioned opposite said insulating walls, opposed fork-shaped connector members within said housing secured to said insulating walls, a supply cord entering said housing and having its conducting elements secured to said connector members, said member also having aligned bores opening into said recess over said leads, and the leads having openings aligned with said bores and said openings and the bores being aligned with the openings in said insulating walls, and electrically conducting pins inserted through said bores and openings in said leads and insulating walls so as to rotatably mount said housing, and so as to be inserted between the prongs of said fork-shaped connector members, and means detachably and electrically connecting said pins with said leads.

5. Connector structure comprising a member provided with a recess therein having opposed walls and an inside opening and an outside opening located between said walls, and said member also having a pair of aligned bores opening into said walls respectively, a pair of supply leads entering said recess through its inner opening and having sections lying along said walls respectively and also having openings in said sections aligned with the openings in said bores, screws inserted through said bores and threaded into the holes in said leads and having portions projecting into said recess, a cylindrical casing inserted in said recess through its outer opening and having a pair of opposed electrically insulating end walls that have openings into which said projecting ends of said screws are inserted, a pair of fork-like connector members anchored to said end walls respectively so that their forked sections embrace said projecting ends of said screws, and an electrical supply cord inserted into said recess through its outer opening and also inserted in an opening provided for it in said housing, the conductors of said cord being electrically connected to said anchored fork-like connector members.

6. Swivel connector structure comprising supply leads having aligned opposed terminal pins, a casing journaled on said pins so that it may be rotated thereon, said pins projecting into said casing, an electrical supply cord, electrical connectors within said casing connected to the conductors of said cord and engaging the portions of said pins that project into said casing, and said casing having radial slots therein extending from said pins to the outer edges of the casing, said slots being arranged at a relatively wide angle to said supply cord so that when said casing is in its normal operative position it cannot be pulled away from said pins by the supply cord.

7. Electrical supply connector means comprising a pair of opposed supply leads, a member provided with a recess for receiving said leads, a casing within said recess between said leads, said recess having an opening through which said casing is inserted, electrically conducting pins projecting into said recess for rotatably supporting said casing, a supply cord entering said recess through said recess opening and having conducting elements entering said casing, connectors within said casing connected to said conducting elements and yieldingly engaging said pins, means electrically connecting said pins with said leads, and the walls of said casing opposite said leads respectively having radial slots therein extending from said pins to the outer edges of the casing so that said casing can be removed from said pins when said casing is in a predetermined angular position in said recess, and said slots being arranged substantially at right angles to said supply cord so that when said casing is in its normal operative position in said recess and said cord enters the recess through said recess opening said casing cannot be pulled from said pins by said cord.

HEBER L. NEWELL.